United States Patent
Dunn et al.

(10) Patent No.: US 7,265,921 B2
(45) Date of Patent: Sep. 4, 2007

(54) METHOD TO INCREASE THE AMOUNT OF CUSTOMER DATA ON A HARD DISK DRIVE

(75) Inventors: George Anthony Dunn, San Jose, CA (US); Weining Zeng, Cupertino, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/775,689

(22) Filed: Feb. 10, 2004

(65) Prior Publication Data

US 2005/0174671 A1    Aug. 11, 2005

(51) Int. Cl.
  *G11B 5/09* (2006.01)
  *G11B 5/02* (2006.01)
  *G11B 21/02* (2006.01)
(52) U.S. Cl. .............. 360/48; 360/55; 360/75
(58) Field of Classification Search ............ 360/75–76, 360/48, 53, 72.1, 77.02, 77.05, 77.08, 77.11, 360/78.14
See application file for complete search history.

(56) References Cited

U.S. PATENT DOCUMENTS

| | | | | |
|---|---|---|---|---|
| 4,851,933 | A | * | 7/1989 | Sugaya et al. ............. 360/61 |
| 5,682,274 | A | * | 10/1997 | Brown et al. ............ 360/77.04 |
| 5,901,003 | A | | 5/1999 | Chainer et al. |
| 6,204,989 | B1 | * | 3/2001 | Hrinya et al. ............ 360/77.06 |
| 6,873,488 | B2 | * | 3/2005 | Teo et al. ................. 360/77.06 |
| 2004/0001268 | A1 | * | 1/2004 | Deeman et al. ............... 360/51 |

FOREIGN PATENT DOCUMENTS

EP    0 989 556 A1    3/2000

* cited by examiner

*Primary Examiner*—William Korzuch
*Assistant Examiner*—Daniell L. Negrón
(74) *Attorney, Agent, or Firm*—Patrick Ducan; Steven J. Cahill; Joseph P. Curtin

(57) ABSTRACT

Format efficiency of a hard disk of a hard disk drive having a rotary actuator and a read/write head having a read element that is offset from a write element is improved by writing a data track having a length that is based on an arc of the rotary actuator, the radial position of the read/write head with respect to the hard disk and the offset between the read element and the write element.

20 Claims, 7 Drawing Sheets

METHOD TO INCREASE THE AMOUNT OF CUSTOMER DATA ON A HARD DISK DRIVE

BACKGROUND OF THE INVENTION

1. Field of the Invention

The present invention relates to hard disk drives (HDDs). More particularly, the present invention relates to a technique for increasing the format efficiency of an HDD.

2. Description of the Related Art

FIG. 1 shows an exemplary hard disk drive (HDD) 100 having a magnetic read/write head (or a recording slider) 101 that includes, for example, an offset head, that is positioned over a selected track on a magnetic disk 102 using a dual-stage servo system for writing data to and/or reading data from disk 102. Customer data and servo sample data are recorded in arrays of concentric data information tracks on the surface of disk 102. While HDD 100 shows only a single magnetic disk 102, HDDs typically have a plurality of stacked, commonly rotated, rigid magnetic disks.

The dual-stage servo system of HDD 100 includes an actuator 105, typically a voice-coil motor (VCM), for coarse positioning a read/write head suspension 106 and a secondary actuator, such as a microactuator or micropositioner, for fine positioning read/write head 101 over a selected track. As used herein, a microactuator (or a micropositioner) is a small actuator that is placed between a suspension and a slider and moves the slider relative to the suspension.

The ratio of the amount of storage space available on an HDD to the actual stored customer data is commonly referred to as the "format efficiency." Techniques that have been used for increasing the format efficiency include decreasing the length of the servo samples, increasing the numbers of tracks-per-inch and the number of bits-per-inch and minimizing the write-to-read recovery times. Nevertheless, the format efficiency of HDDs has not declined significantly from generation to generation of HDDs and new techniques for increasing the format efficiency are being investigated. Techniques that increase the areal density, however, increase the numbers of servo samples, increase the amount of error correction codes, and increase coding flush.

As the numbers of tracks-per-inch increase beyond 100,000 tracks-per-inch and the read-to-write head spacing requirements increase, the hard disk areal space that has been previously ignored is now significant and worth exploiting. Improving the overall format efficiency of a 300 GB hard disk drive by, for example, 1% would yield 3 GB of available space for customer data.

Consequently, what is needed is a technique that increases the overall format efficiency of a hard disk drive.

BRIEF SUMMARY OF THE INVENTION

The present invention provides a technique that increases the overall format efficiency of a hard disk drive.

The advantages of the present invention are provided by a method for improving the format efficiency of a hard disk of a hard disk drive having a rotary actuator and a read/write head having a read element that is offset from a write element. According to the present invention, a radial position of the read/write head with respect to the hard disk is determined. Then, a data track is written having a length between successive servo sample areas that is based on an arc of the rotary actuator, the radial position of the read/write head with respect to the hard disk and the offset between the read element and the write element. One exemplary embodiment of the present invention provides that the length of the data track is determined from a look-up table. Another exemplary embodiment of the present invention provides that the length of the data track is determined based on a determination of the arc of the rotary actuator, the determined position of the read/write head with respect to the hard disk, and the physical offset between the read element and write element. Yet another exemplary embodiment of the present invention provides that the length of the data track is based on an angular position of the rotary actuator.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a technique that increases the overall format efficiency of a hard disk drive. In that regard, the present invention utilizes a portion of the space that is not conventionally used on a hard disk, thereby improving the overall format efficiency of an HDD. Further, the present invention provides a technique for quantifying the format efficiency loss of a hard disk based on the angle of a rotary actuator or based on a track number.

The present invention is preferably implemented on a product-by-product basis because the mechanical parameters and the head dimensions must be established on an individual basis so that a mathematical profile based on the radius of the hard disk can be determined. The present invention provides two embodiments. A first embodiment utilizes a lookup table, which is relatively simple and easy to implement, but does not provide optimal performance. A second embodiment of the present invention uses a polynomial that calculates the correct areal space based on the track number and provides an overall improvement in format efficiency that is significantly more optimal than the first embodiment of the present invention.

Figure 1:
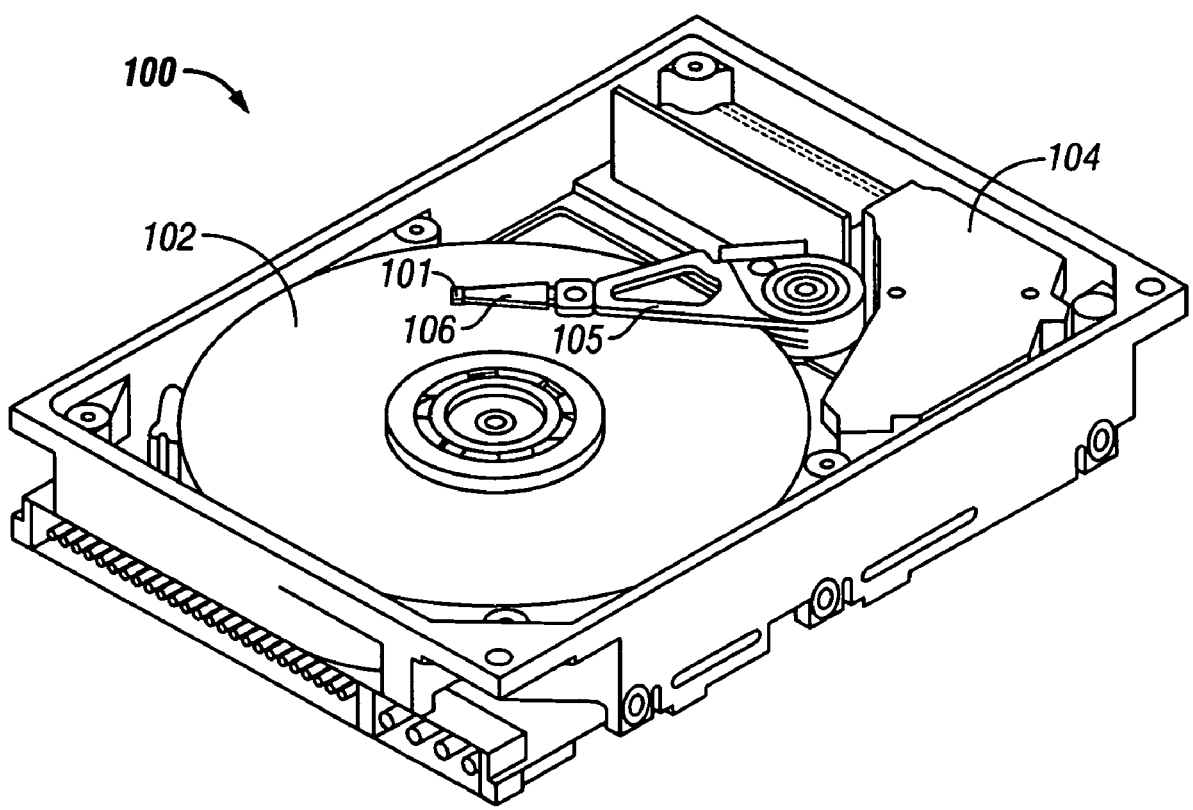
FIG. 1 shows an exemplary HDD having a rotary actuator.
Figure 2:
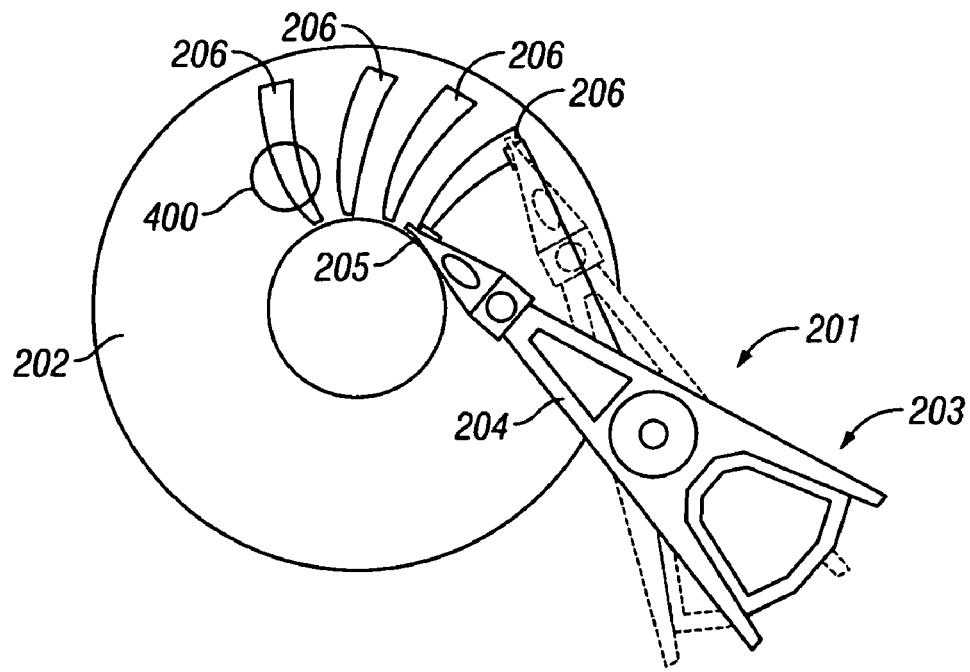
FIG. 2 depicts an exemplary arrangement of a rotary actuator of an HDD in relationship to a hard disk.
Figure 3:
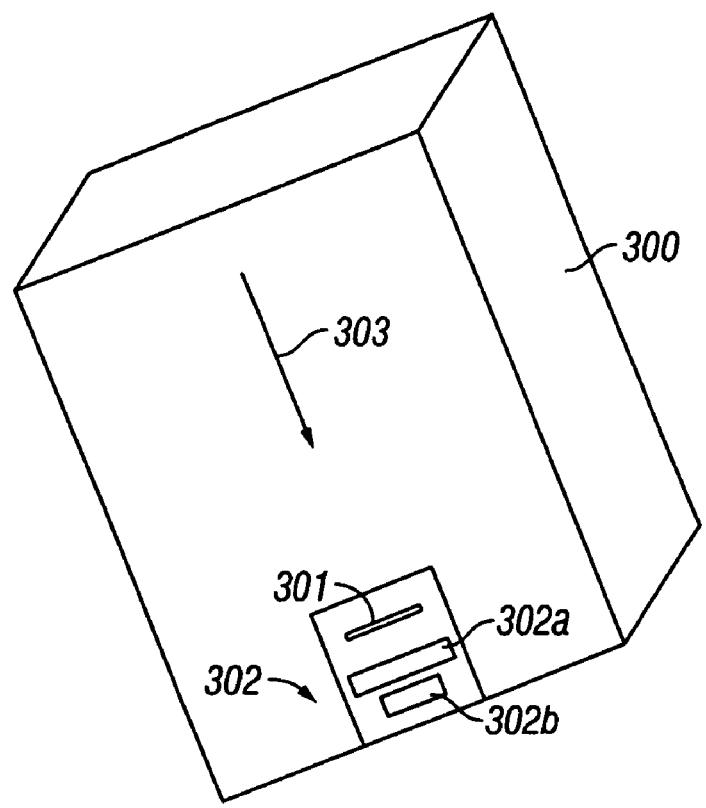
FIG. 3 depicts an exemplary read/write head having a read element and a write element.

FIG. 2 depicts an exemplary arrangement of a rotary actuator 201 of an HDD in relationship to a hard disk 202. A rotary actuator is the type of actuator that is most commonly used in HDDs today. Rotary actuator 201 includes a drive end 203 that is integral with a VCM (not shown), a suspension 204 and an offset read/write head 205 that is located distal from drive end 203. Hard disk 202 rotates counter-clockwise in FIG. 2. FIG. 3 depicts an exemplary read/write head 300 having a read element 301, such as a Giant Magnetoresistive (GMR) device, and a write element 302 having write poles 302a and 302b. A hard disk (not shown) moves past slider 300 in the direction of arrow 303.

As rotary actuator 201 is driven by the VCM, rotary actuator 201 pivots around a pivot point. As rotary actuator 201 pivots, read/write head 205 sweeps across the surface of hard disk 202 to selected positions that are between one extreme that is toward the center of hard disk 202 (depicted with the outline of rotary actuator 201 shown as solid) to another extreme toward the outer edge of hard disk 202 (depicted with the outline of rotary actuator 201 shown as dotted). As rotary actuator 201 pivots, the motion of read/write head 205 is in an arc with respect to the surface of hard disk 201 that coincides with the radially shape area of servo samples 206 that have been written on the surface of hard disk 202.

Figure 4:
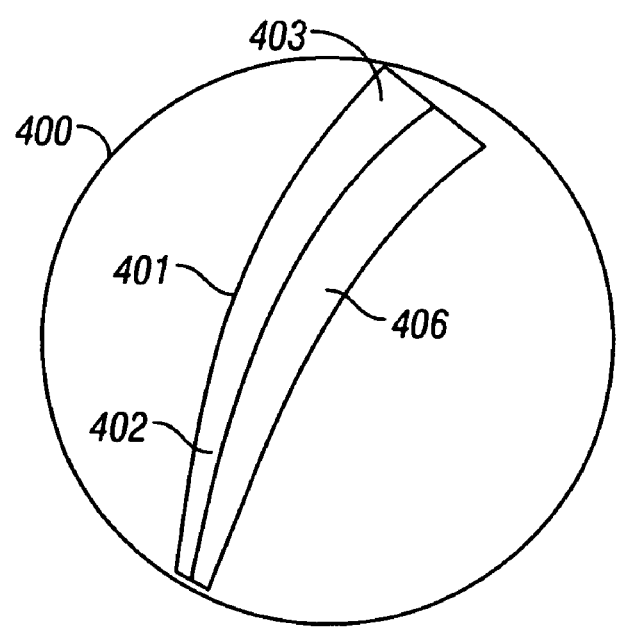
FIG. 4 shows an enlarged view of a selected radially shaped servo sample area shown in FIG. 2.

A portion of the areal space on a hard disk that is available for customer data, that is, the areal space that is not used for servo samples, is not used on a conventional HDD because of the physical properties of the angle of rotation of the rotary actuator and the physical separation of the read sensor and the write element of the read/write head. FIG. 4 shows an enlarged view of a selected radially shaped servo sample area 400 shown in FIG. 2. More specifically, FIG. 4 shows an area 401 that is conventionally unused and that precedes servo sample area 406 as hard disk 202 rotates. A portion 402 of unused area 401 that is closer to the center of hard disk 202 (FIG. 2) is narrower than a portion 403 of unused area 401 that is closer to the outer edge of disk 202.

Figure 5A:
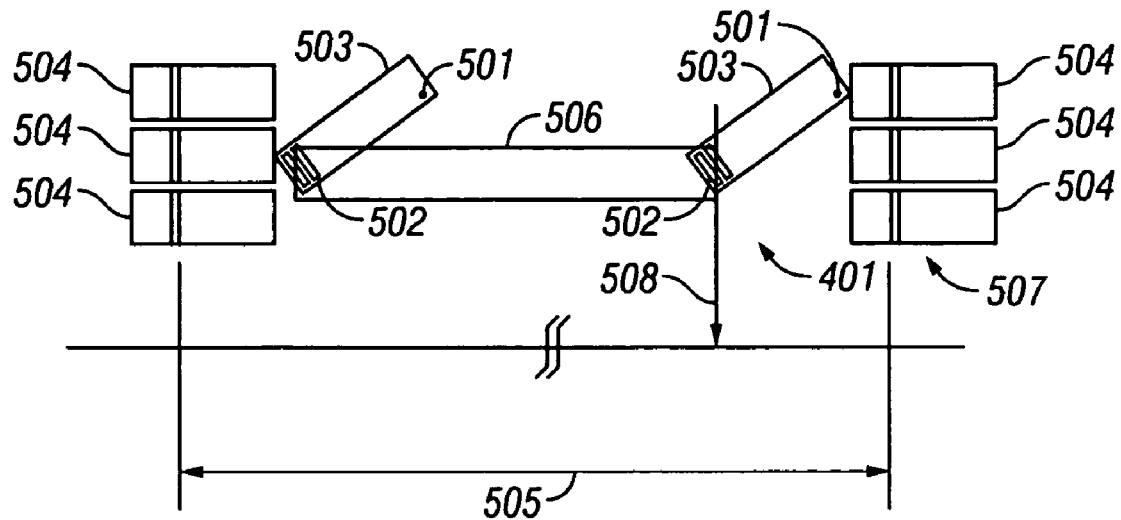
FIGS. 5A and 5B respectively depict the physical arrangement of the angle of rotation of the rotary actuator and the physical separation of a read element and a write element of a read/write head toward the center of a hard disk and toward the outer edge of the hard disk that give rise to shape of an unused area.
Figure 5B:
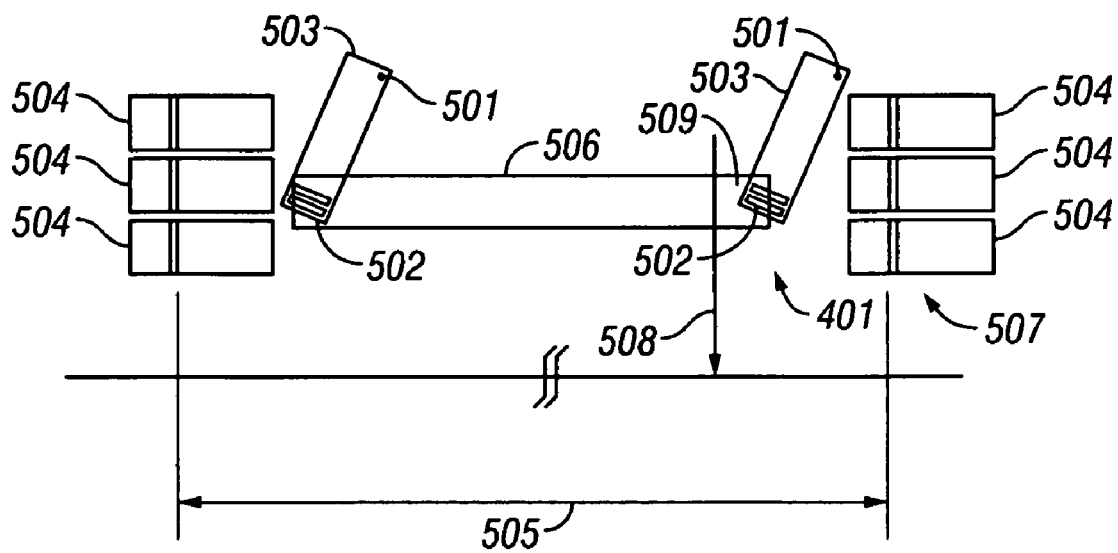

FIGS. 5A and 5B respectively depict the physical arrangement of the angle of rotation of the rotary actuator and the physical separation of a read element 501 and a write element 502 of a read/write head 503 toward the center of a hard disk and toward the outer edge of the hard disk that give rise to shape of unused area 401. The rotation of the hard disk is from right to left in both FIGS. 5A and 5B.

Servo samples 504 are separated by a sample-to-sample period 505. Read element 501 senses servo samples 504 in order to keep read/write head 503 positioned over a selected customer data track 506. Read element 501 must become active and read, or sense, every servo sample. Write element 502 must turn off before it reaches the beginning 507 of the servo sample. Unused area 401 is a small area that is between the end 508 of customer data track 506 and the beginning 507 of servo sampled 504.

Unused space 401 has been conventionally assumed to be the same for all angles of the actuator stroke and so insignificant as not to be worried about. Nevertheless, portion 402 of unused area 401 (FIG. 4), which is closer to the center of hard disk 202, is narrower than portion 403 of unused area 401, which is closer to the outer edge of disk 202. FIG. 5B shows a portion 509 of unused area 401 that is utilized by the present invention that would otherwise be wasted because of the conventional assumption of the uniformity of unused space 401.

Figure 6:
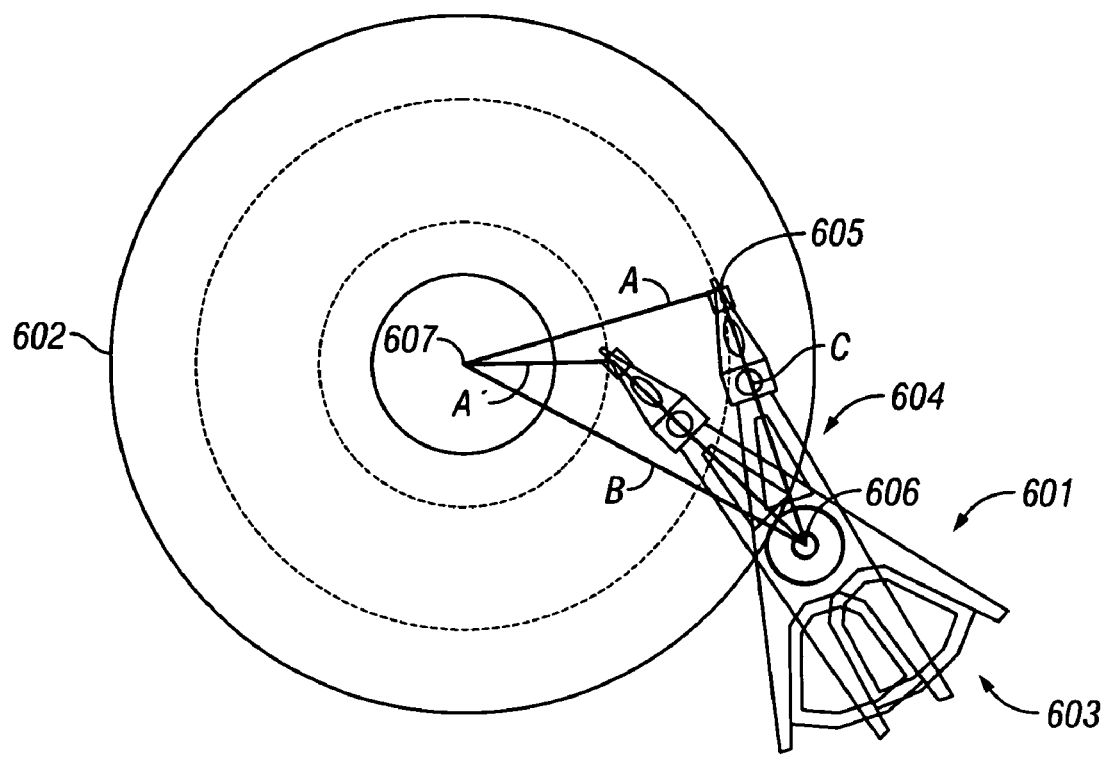
FIG. 6 depicts a detailed physical arrangement of a rotary actuator of an HDD in relationship to a hard disk.

FIG. 6 depicts a detailed physical arrangement of a rotary actuator 601 of an HDD in relationship to a hard disk 602. In FIG. 6, rotary actuator 601 includes an actuator end 603 that is integral with a VCM (not shown), an actuator arm 604 and an offset read/write head 605 that is located distal from the actuator end 603. Hard disk 602 rotates counter-clockwise in FIG. 6. As rotary actuator 601 is driven by the VCM, rotary actuator 601 pivots around a pivot point 606. Rotary actuator 601 is depicted in FIG. 6 with read/write head 605 in a first position at a radius A from the center of hard disk 602 and with read/write head 605 in a second position at a radius A' from the center of hard disk 602. Distance B is the distance between pivot 606 and the center 607 of hard disk 602. Distance C is the distance between pivot 606 and read head sensor 605.

Figure 7:
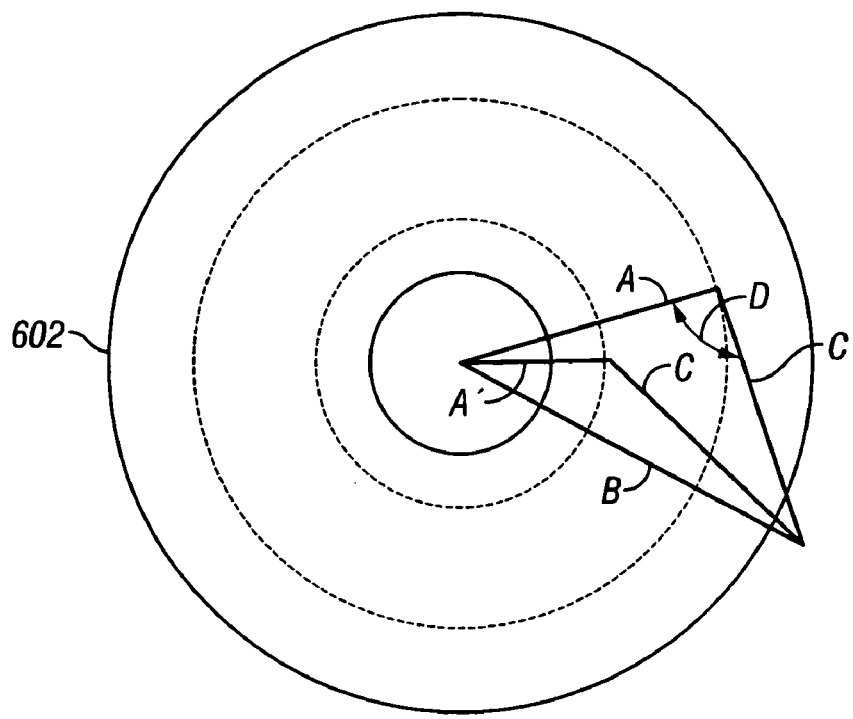
FIG. 7 depicts the physical arrangement of the rotary actuator and the hard disk shown in FIG. 6 with the rotary actuator removed.

FIG. 7 depicts the physical arrangement of rotary actuator 601 and a hard disk 602, shown in FIG. 6, with rotary actuator 601 removed. As rotary actuator 601 pivots around pivot 606, radius A changes while distances B and C remain constant. The cosine of angle D is given by:

$$\cos D = \frac{A^2 + C^2 - B^2}{2AC}. \tag{1}$$

Figure 8:
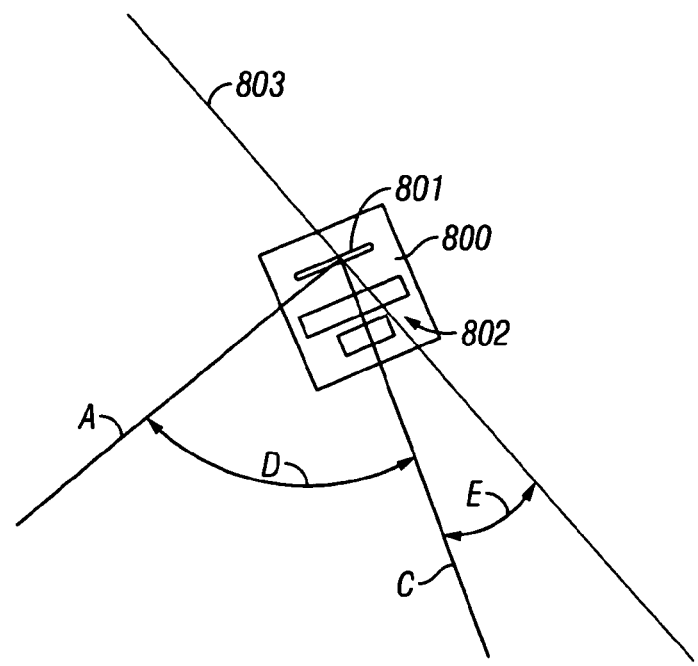
FIG. 8 depicts the physical arrangement used for determining the angle E of a read/write head with respect to a circumferential data track at a given radius A.

FIG. 8 depicts the physical arrangement used for determining the angle E of a read/write head 800 with respect to a circumferential data track 803 at a given radius A. Read/write head 800 includes a read element 801 and a write element 802. Angle E is given by $$E=90°-D. \tag{2}$$

Figure 9:
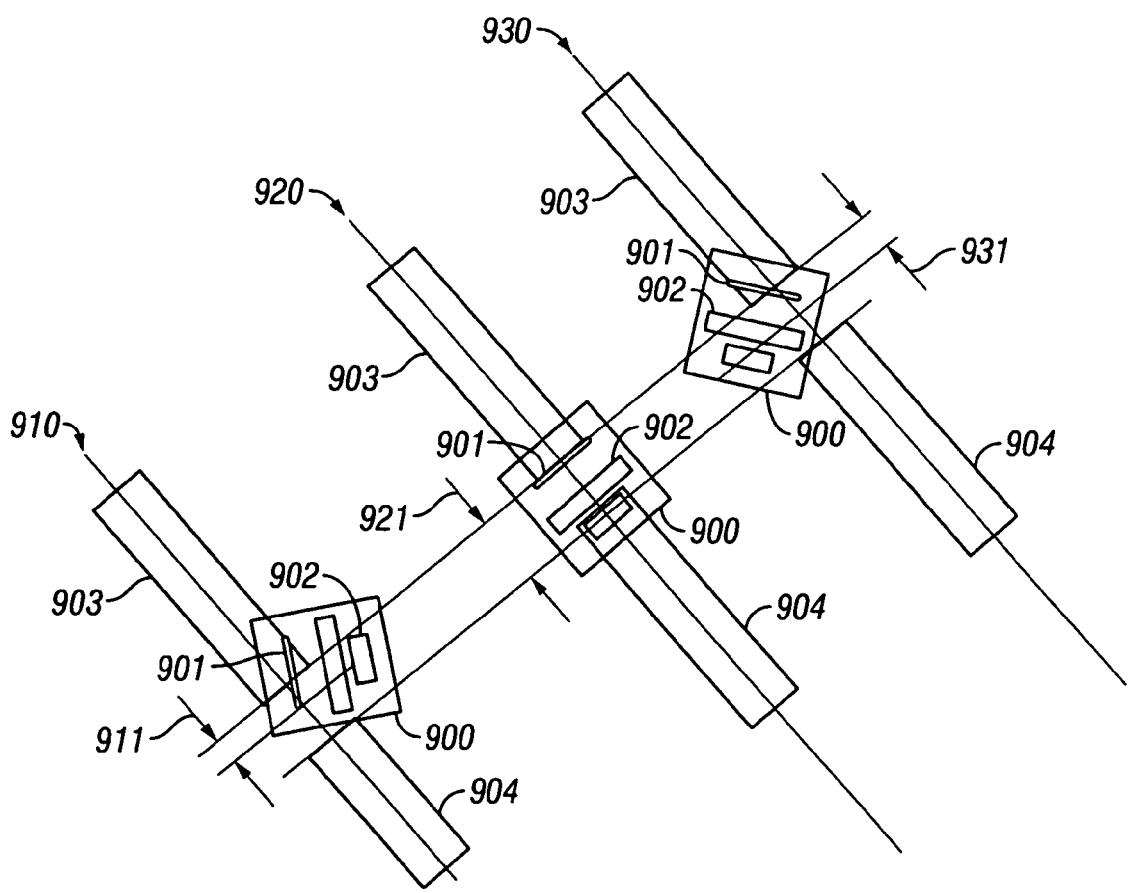
FIG. 9 depicts that the spacing loss decreases at the outer and inner diameters of a hard disk.

The actual areal space loss depends on the mechanical design of the actuator, the dimensions of the disk and the stroke of the rotary angle. FIG. 9 depicts that the spacing loss decreases at the outer and inner diameters of a hard disk. In FIG. 9, a read/write head 900 having a read element 901 and a write element 902 is depicted near the inner diameter 910, at zero skew 920 (i.e., E=0°) and near the outer diameter 930 of a hard disk with respect to a servo sample 903 and customer data 904. Near the inner diameter 910 and near outer diameter 930, the respective separations 911 and 931 between the read element 901 and write element 902 are reduced in comparison to separation 921 when read/write head 900 is at zero skew 920.

Figure 10:
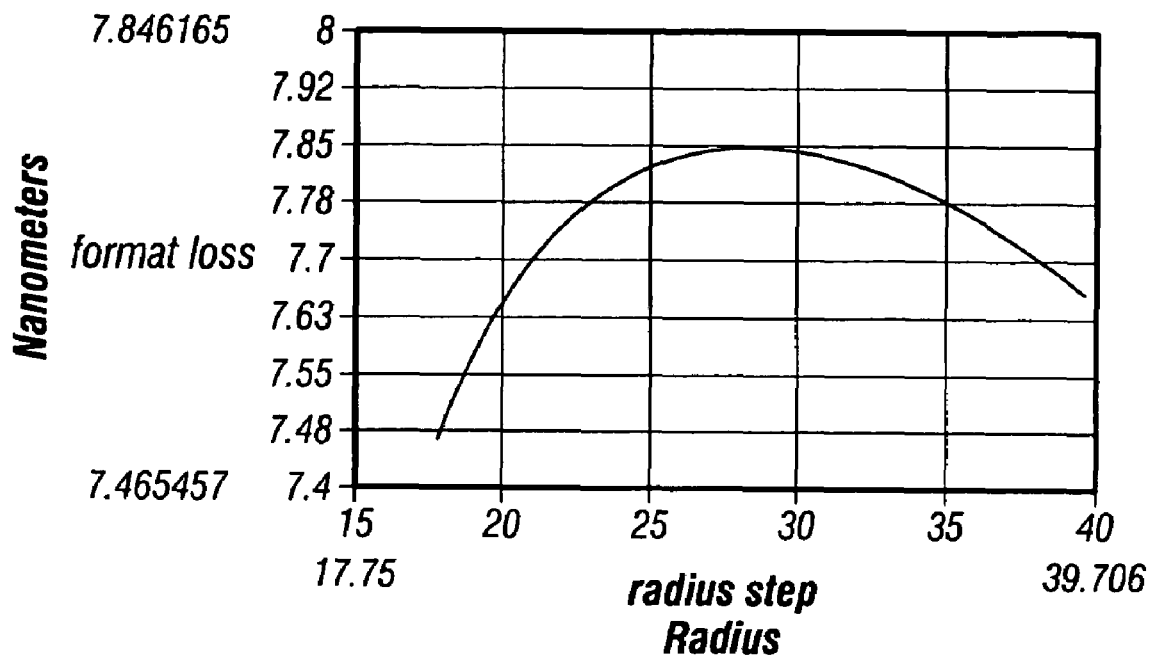
FIG. 10 shows a graph of the areal space loss in nanometers as a function of radius for a hard disk rotating at 10,000 rpm.
Figure 11:
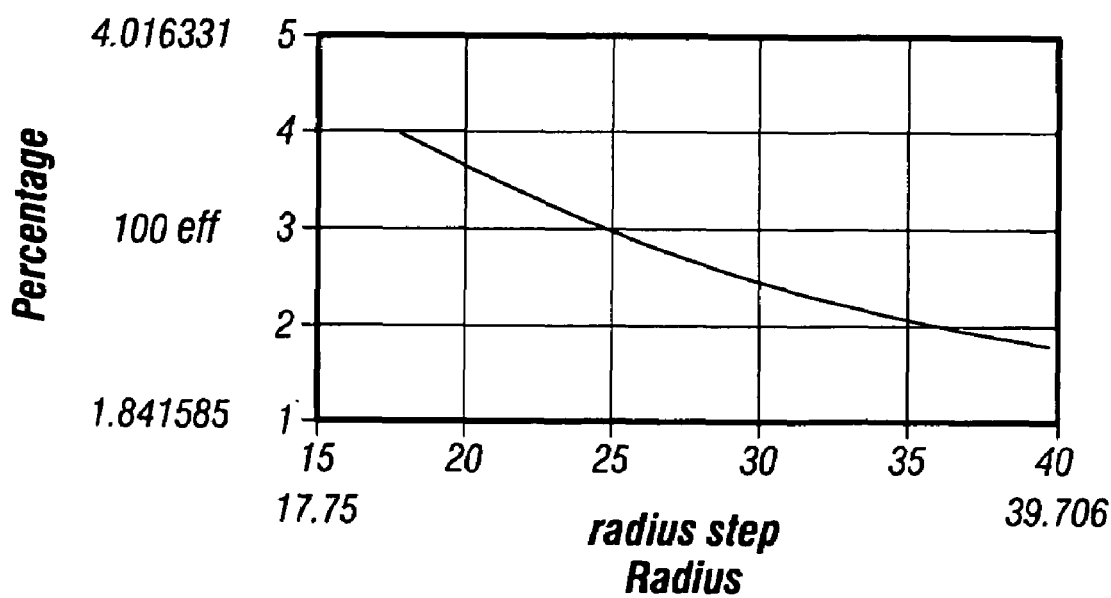
FIG. 11 shows a graph of the percentage of format loss corresponding to the graph of FIG. 10.
Figure 12:
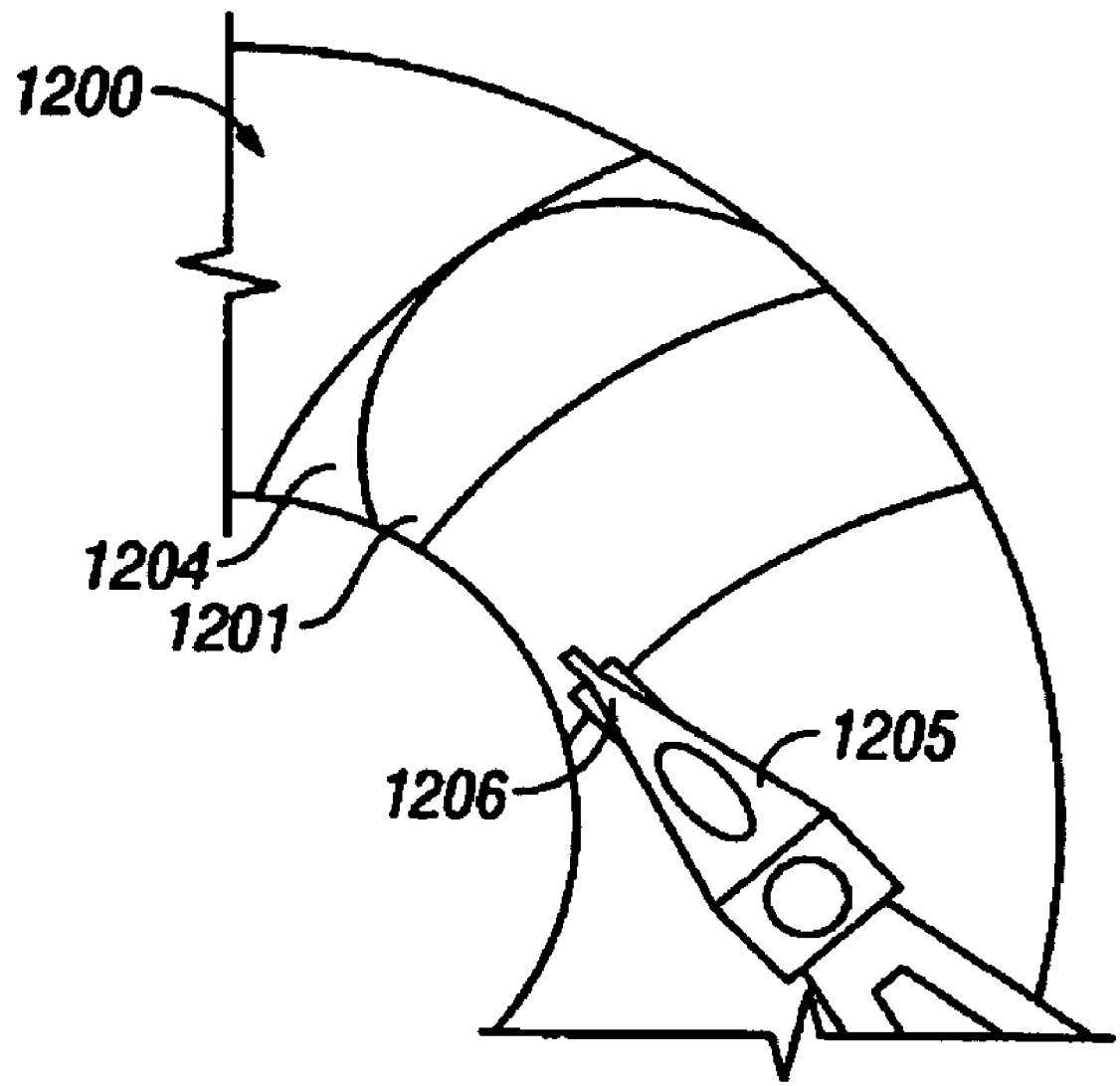
FIG. 12 depicts a portion of an unused area that can be utilized for customer data after the format efficiency of a hard disk drive has been improved based on a mathematical calculation of the spacing distance between the read sensor and the write element as a function of the radius of the hard disk drive according to the present invention.

FIG. 10 shows a graph of the areal space loss in nanometers as a function of radius for a hard disk rotating at 10,000 rpm. The maximum areal space loss, which occurs near the middle radius, in this case 7.85 nm, has been conventionally used for as the space loss that occurs at the outer and inner radius of a hard disk. FIG. 11 shows a graph of the percentage of format loss corresponding to the graph of FIG. 10. FIG. 11 shows that a loss of 7.48 nanometers of distance along a track occurs at the inner radius of the hard disk. A loss of 7.65 nanometers of distance along a track occurs near the outer radius of the hard disk. FIG. 12 depicts a portion 1204 of unused area 1201 that can be utilized for customer data after the format efficiency of a hard disk drive 1200 has been improved based on a mathematical calculation of the spacing distance between the read sensor and the write element as a function of the radius of hard disk drive 1200 according to the present invention. In FIG. 12, hard disk drive 1200 includes a suspension 1205 of a rotary actuator, and an offset read/write head 1206. The increase in format efficiency is depicted as 509 in FIG. 5B as a function of track length 506.

Thus, as much as 2.2% can be recovered across the stroke from inner diameter to outer diameter of a hard disk. At the zero angle between the data track and the read sensor, the present invention provides no gain of unused space. At the outer radius where the data rate is highest, however, the present invention provides a maximum gain of unused space.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for improving the format efficiency of a hard disk of a hard disk drive, the hard disk drive having a rotary actuator and a read/write head, the read/write head having a read element and a write element, the method comprising:
   determining a radial position of the read/write head with respect to the hard disk;
   calculating a varying spacing distance between the read element and the write element measured along each data track of the hard disk as a function of a radius of the hard disk, wherein the varying spacing distance between the read element and the write element varies from track to track at different distances from a center of the hard disk; and
   writing data tracks on the hard disk at varying distances from the center of the hard disk so that lengths of unused areas between data sectors and subsequent servo samples in each of the data tracks on the hard disk are substantially equal to the varying spacing distance between the read element and the write element as measured along a corresponding data track of the hard disk.

2. The method according to claim 1, further comprising determining lengths of the data tracks from a look-up table.

3. The method according to claim 1, further comprising determining lengths of the data tracks based on a determination of the arc of the rotary actuator, the determined position of the read/write head with respect to the hard disk, and a physical offset between the read element and write element.

4. The method according to claim 1, further comprising determining lengths of the data tracks based on an angular position of the rotary actuator.

5. The method according to claim 1, wherein writing the data tracks on the hard disk further comprises writing data tracks on the hard disk so that edges of the data tracks form a radius of curvature that is smaller than a radius of curvature formed by edges of the subsequent servo samples.

6. The method according to claim 1 wherein a maximum areal space loss caused by the unused areas occurs near a middle radius of the hard disk.

7. The method according to claim 6 wherein a minimum areal space loss caused by the unused areas occurs at the inner radius of the hard disk.

8. A disk drive, comprising:
   a rotary actuator;
   a read/write head having a read element that is offset from a write element, wherein a distance between the read element and the write element along each data track of a hard disk varies from track to track at different distances from a center of the hard disk; and
   at least one hard disk drive, wherein the hard disk drive is configured to write data to data tracks on the hard disk at varying distances from the center of the hard disk so that lengths of unused areas between data sectors and subsequent servo samples in each of the data tracks on the hard disk are substantially equal to the varying distance between the read element and the write element as measured along a corresponding data track of the hard disk.

9. The hard disk drive according to claim 8, wherein a length of each data track is determined from a look-up table.

10. The hard disk drive according to claim 8, wherein lengths of the data tracks are based on a determination of the arc of the rotary actuator, a determined position of the read/write head with respect to the hard disk, and the offset between the read element and write element.

11. The hard disk drive according to claim 8, wherein lengths of the data tracks are based on an angular position of the rotary actuator.

12. The disk drive according to claim 8, wherein the at least one hard disk drive is configured to write the data tracks on the hard disk so that edges of the data tracks form a radius of curvature that is smaller than a radius of curvature formed by edges of the subsequent servo samples.

13. The disk drive according to claim 8 wherein a maximum areal space loss caused by the unused areas occurs near a middle radius of the hard disk.

14. The disk drive according to claim 13 wherein an areal space loss caused by the unused areas in at least some of the tracks is less than 7.7 nanometers.

15. A system for reading and writing data, comprising:
   a head having a read element and a write element, wherein a distance between the read element and the write element along each data track of a hard disk varies from track to track at different distances from a center of the hard disk; and
   at least one hard disk drive configured to write data to data tracks on the hard disk at varying distances from the center of the hard disk so that lengths of unused areas between data sectors and subsequent servo samples in each of the data tracks on the hard disk are substantially equal to the varying distance between the read element and the write element as measured along a corresponding data track of the hard disk.

16. The system according to claim 15 wherein the length of each of the data tracks is determined from a look-up table.

17. The system according to claim 15, wherein the at least one hard disk drive is configured to write the data tracks on the hard disk so that edges of the data tracks form a radius of curvature that is smaller than a radius of curvature formed by edges of the subsequent servo samples.

18. The system according to claim 15 wherein lengths of the data tracks between successive servo samples are based on a radial position of the head with respect to the hard disk, and the varying distance between the read element and write element.

19. The system according to claim 15 wherein a maximum areal space loss caused by the unused areas occurs near a middle radius of the hard disk.

20. The system according to claim 19 wherein an areal space loss caused by the unused areas on at least some of the tracks is less than 7.55 nanometers.

* * * * *